United States Patent [19]

Foldenauer

[11] Patent Number: 5,125,278
[45] Date of Patent: Jun. 30, 1992

[54] VOLUMETRIC PIPETTE

[75] Inventor: Kenneth J. Foldenauer, Anaheim, Calif.

[73] Assignee: V-Tech, Inc., Pomona, Calif.

[21] Appl. No.: 600,004

[22] Filed: Oct. 18, 1990

[51] Int. Cl.$^5$ .............................................. G01N 1/14
[52] U.S. Cl. .................................................. 73/864.11
[58] Field of Search ....................... 73/864.01–864.22;
422/100; 128/760, 763, 765

[56] References Cited

U.S. PATENT DOCUMENTS

| | | | |
|---|---|---|---|
| 1,204,368 | 11/1916 | Lowy | 73/864.01 |
| 3,219,417 | 11/1965 | Klingbeil et al. | 73/864.11 |
| 4,690,005 | 9/1987 | Tervamaki et al. | 73/864.12 |
| 4,779,768 | 10/1988 | St. Amand | 422/100 |
| 4,823,622 | 4/1989 | Nohl et al. | 73/864.22 |

FOREIGN PATENT DOCUMENTS 434265  1/1912  France ................. 73/864.14

OTHER PUBLICATIONS

Edwards, "Solvent Sampling Siphon", IBM Disclosure, vol. 17, No. 9, Feb. 1975.

*Primary Examiner*—Robert Raevis

[57] ABSTRACT

A volumetric pipette having branches. A liquid sample is drawn up into one branch and a precise volume is expelled by using the second branch. The pipettes of the present invention are conveniently made by blow molding plastic.

3 Claims, 1 Drawing Sheet

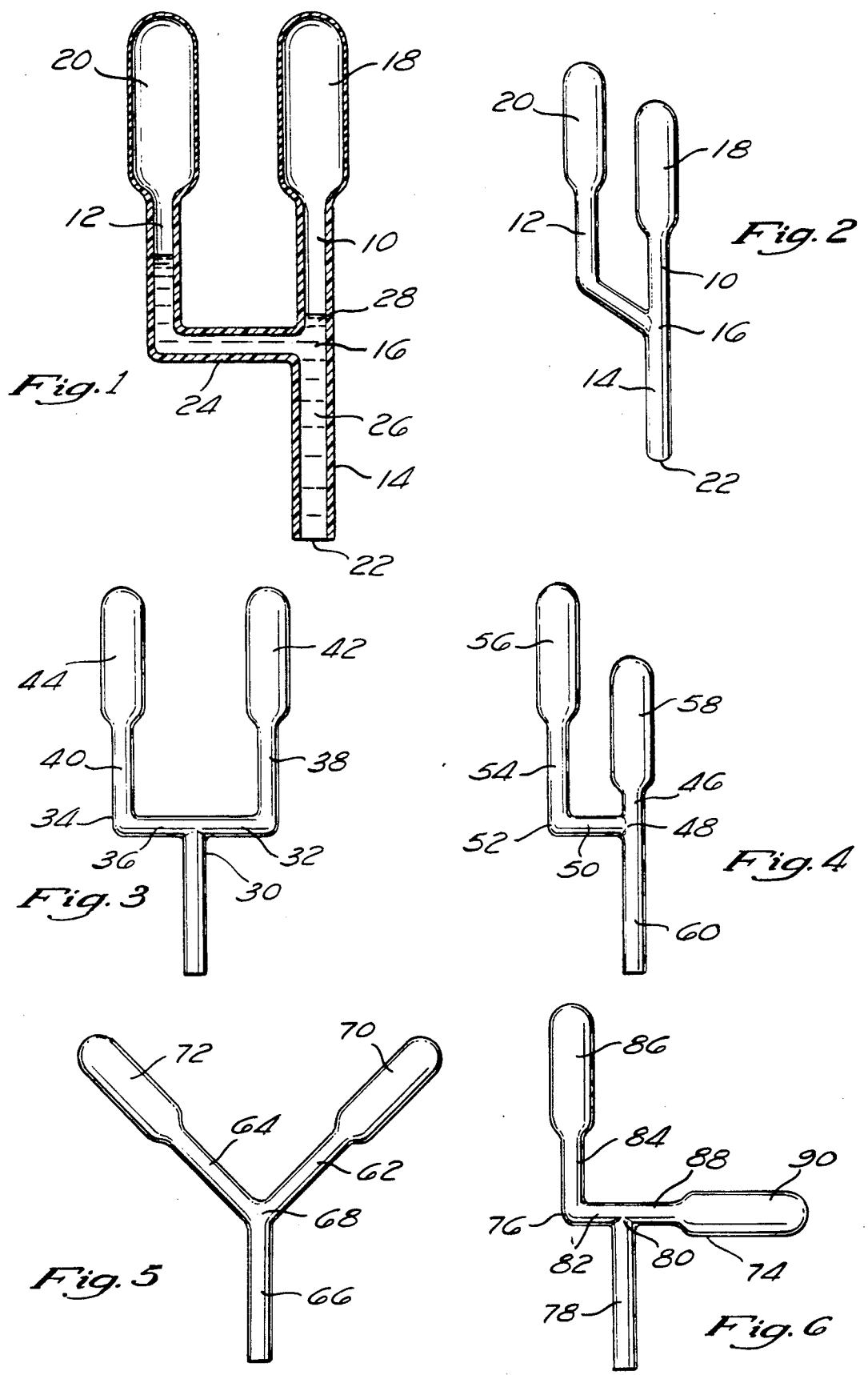

VOLUMETRIC PIPETTE

FIELD OF THE INVENTION

This invention related to volumetric pipettes, particularly to disposable volumetric pipettes.

RELEVANT ART

Volumetric pipettes are devices that can acquire and dispense a precise volume of liquid. Many laboratory uses require disposable volumetric pipettes thereby enabling lab workers to make quick precise volume transfers. This is particularly important in the medical field, where transfers of infectious or otherwise contaminated bodily or other liquids for analysis and diagnosis are routine. Disposal of contaminated laboratory equipment is frequently required. However, conventionally shaped disposable volumetric pipettes made entirely of plastic are not speedy and accurate to use. Furthermore, they must be made precisely thereby tending to increase the cost of the pipettes used.

One approach is that taught by St. Armand, U.S. Pat. No. 4,779,768. There a one-piece blow molded pipette has a receiving reservoir between the pipette stem and the squeezable bulb. Fluid in excess of the amount needed to fill the pipette stem flows into the receiving reservoir and is not ejected with the fluid in the pipette stem when the bulb is squeezed a second time.

One problem with this approach is that the reservoir may fill past the junction with the pipette stem. Then one may inadvertently dispense more fluid than the pipette is calibrated to deliver.

It would be advantageous to have a pipette having a geometry that precluded inadvertently dispensing more fluid than planned for.

SUMMARY OF THE INVENTION

This invention provides a volumetric pipette having branches. A liquid sample is drawn up into one branch and a precise volume is expelled by using the second branch. The pipettes of the present invention are conveniently made by blow molding plastic.

An aspect of this invention is a volumetric pipette comprising:
 a first tubular branch having a means to draw liquid;
 a second tubular branch having a means to expel liquid to the first tubular branch and joined at a junction point;
 a third tubular branch terminating with an open end and joined to the first tubular branch and the second tubular branch at the junction point;
 wherein a liquid can be drawn up into the third tubular branch, past the junction point, and into the first tubular branch, and a precise amount can be dispensed by squeezing the second bulb expelling the liquid in the third branch.

A further aspect of this invention is a volumetric pipette comprising:
 a branched tubular body having a first branch, a second branch, a third branch and a junction point;
 means for drawing a liquid up the first and third branch past the junction point; and to the second branch. One further aspect of this invention is a method of delivering a precise volume of liquid comprising:
 drawing liquid up a first branch of a branched pipette, past the junction point; and
 expelling a precise volume of liquid by increasing the air pressure in the second branch.

BRIEF DESCRIPTION OF THE DRAWINGS

FIG. 1 shows a cut away side view of an embodiment of this invention.

FIG. 2 shows a perspective view of the embodiment shown in FIG. 1.

FIG. 3 shows a side view of another embodiment of this invention.

FIG. 4 shows a side view of yet another embodiment of this invention.

FIG. 5 shows a side view of still another embodiment of this invention.

FIG. 6 shows a side view one further embodiment of this invention.

DETAILED DESCRIPTION OF THE INVENTION

Referring to FIG. 1 and FIG. 2, the disposable pipette has a first branch 10, a second branch 12 and a third branch 14 meeting at a central junction 16. The first branch 10 terminates in a first flexible bulb 18, and the second branch 12 terminates in a second flexible bulb 20. The third branch 14 has an open ended bottom 22 to allow liquid access to the inside of the device.

In a preferred embodiment, the first branch 10 and the third branch 14 are disposed in substantially coaxial relationship, and the second branch 12 has a short horizontal extension 24 that extends from the central junction in perpendicular orientation. The second branch 12 then bends and extends upwardly, parallel to the first branch 10. A first flexible bulb 18 and a second flexible bulb 20 are about the same vertical distance from the open ended bottom 22 of the third branch 14.

When filled, liquid 26 fills the third branch 14 and part of the second branch 12. An amount of liquid 28 creeps up the first branch 10. The liquid has been drawn by squeezing the second bulb 20.

Preferably the device of the present invention is made from blow molded plastic. The preferred plastic is polyethylene, but other flexible materials can be substituted for a one piece unit.

The precise geometric relationship between the first branch, the second branch, and the third branch is not critical. A preferred geometric relationship is shown in FIG. 1 and FIG. 2, but others function adequately. A wide variety of shapes are possible, refer for example, to FIGS. 3-6.

Referring to FIG. 3 the first branch 30 has a first horizontal extension 32 and second branch 34 has a second horizontal extension 36. At the end of the first horizontal extension 32 a first vertical segment 38 extends vertically. Similarly, at the end of the second vertical extension 36 a second vertical segment 40 extends vertically. The vertical segments are parallel. The first vertical segment ends in a first squeezable bulb 42 and the second vertical segment ends in a second squeezable bulb 44.

Referring to FIG. 4, a first branch 46 extends vertically from a junction point 48. A horizontal segment 50 extends from the junction point 48 and a second 52 branch has a vertical extension 54 extending upwardly from there. The second branch 52 has a longer vertical extension 54 than the vertical extension 46 on the first branch. The first branch 46 ends in a first squeezable bulb 58, and the second branch 52 ends in a second squeezable bulb 56. A third branch 60 is open to receive liquid.

Referring to FIG. 5 in another embodiment, a first branch 62 a second branch 64 and a third branch 66 meet at a junction point 68. Instead of having two segments that join, the first branch 62 and the second branch 64 extend radially outwardly from the junction point 68. The first branch 62 ends in a first squeezable bulb 70 and the second branch 64 ends in a second squeezable bulb 72. The first squeezable bulb 70 and the second squeezable bulb 72 are spaced far enough apart for convenient operation. The third branch 66 is open to receive liquid.

Referring to FIG. 6, in yet another embodiment, a first branch 74, a second branch 76, and a third branch 78 met at a junction point 80. The second branch 76 has a horizontal extension 82 that joins a vertical branch 84 which terminates in a first squeezable bulb 90.

The third branch 78 is open to receive liquids.

It will be readily understood by those skilled in the art that numerous variations can be made without significantly departing from the spirit of the invention.

In use the user places the third branch into a container of liquid that is to be quantitatively transferred. The user then fills the pipette by squeezing the second bulb. A volume of liquid fills the third branch and part of the second branch. A very small and reproducible volume of liquid will normally be found in the first branch past the junction point. The volume of liquid drawn into the device is not important as long as the third branch is completely filled and entering area 22.

The user then squeezes the first bulb. Only the small amount in the first branch and the amount in the third branch will be expelled. In a mass produced run of pipettes, the variance between the volumes delivered by different pipettes is observed to be less than five percent, and preferably between 1 percent and 3 percent. A volume of liquid in excess of the predetermined volumetric quantity stays in the second branch. The device with the excess liquid, can then be discarded.

In this manner the user is able to quickly draw an amount of liquid, but expel a precise predetermined volume of liquid. Such a device is ideal for contaminated liquids such as those containing infectious agents, radioactivity, and the like. For example, varieties of conventional immunotesting require a known amount of biological fluid. Example of fluids to be tested include serum and urine.

Quantitative results require that a known volume of biological fluid must be tested and the magnitude of the result measured. Usually the magnitude of the signal will be linear compared to the concentration of the analyte, and generally if it is not linear the mathematical relationship is well known. The use of the device of the present invention provides a quick routine way to provide precisely known volumes.

Although for economic reasons the preferred embodiment is molded plastic wherein the first branch the second branches and the third branch are tubes, other embodiments are possible. For example, the tubes can be made from glass tubing. Such an embodiment might be a permanent piece of laboratory glassware. In the glass embodiment squeezable means, for example, rubber or malleable plastic bulbs would have to be externally added.

Although it is greatly preferred that the ends of the first branch and second branch terminate in a squeezable bulb, any other means of obtaining liquid can be substituted. For example, piston means may be employed, or the first branch and second branch can be directly attached to a source of air pressure or vacuum.

I claim:

1. A volumetric pipette for liquid comprising:
   a first tubular branch member having a means to draw up liquid comprising a first squeezable bulb;
   a second tubular branch member having a means to expel liquid drawn up by said first tubular branch member, said means to expel comprising a second squeezable bulb, said first and second squeezable bulbs being disposed adjacent to each other, said first and second tubular branch members meeting to provide liquid communication therebetween at a junction point; and
   a third tubular branch member having a given volume and a first end and a second end, said first end being open to the atmosphere and said second end meeting with said first and second tubular branch members at said junction point, wherein liquid can be drawn up past said junction point to fill said third tubular branch member and at least partially into said first tubular branch member by activating said drawing means, and said volume of said third branch member can be dispensed from its open end by activating said expelling means.

2. A volumetric pipette for liquid comprising:
   a first tubular branch member having a means to draw up liquid;
   a second tubular branch member having a means to expel liquid drawn up by said first tubular branch member, said first and second tubular branch members meeting to provide liquid communication therebetween at a junction point; and
   a third tubular branch member having a given volume and a first end and a second end, said first end being open to the atmosphere and said second end meeting with said first and second tubular branch members at said junction point, wherein said means to draw up liquid comprises a first squeezable bulb disposed at an end of said first tubular member distant from said junction point and said means to expel liquid comprises a second squeezable bulb disposed at an end of said second tubular member distant from said junction point, whereby liquid can be drawn up said open end past said junction point to fill said third tubular branch member and at least partially into said first tubular branch member by squeezing said first squeezable bulb and said volume of liquid contained in said third tubular member can be expelled and dispensed from its open end by squeezing said second squeezable bulb.

3. The volumetric pipette of claim 2, wherein at least one of said first and second tubular branch members have at least a portion below said squeezable bulbs which is offset at an angle from an axis of said third tubular member.

* * * * *